United States Patent Office 3,435,963
Patented Apr. 1, 1969

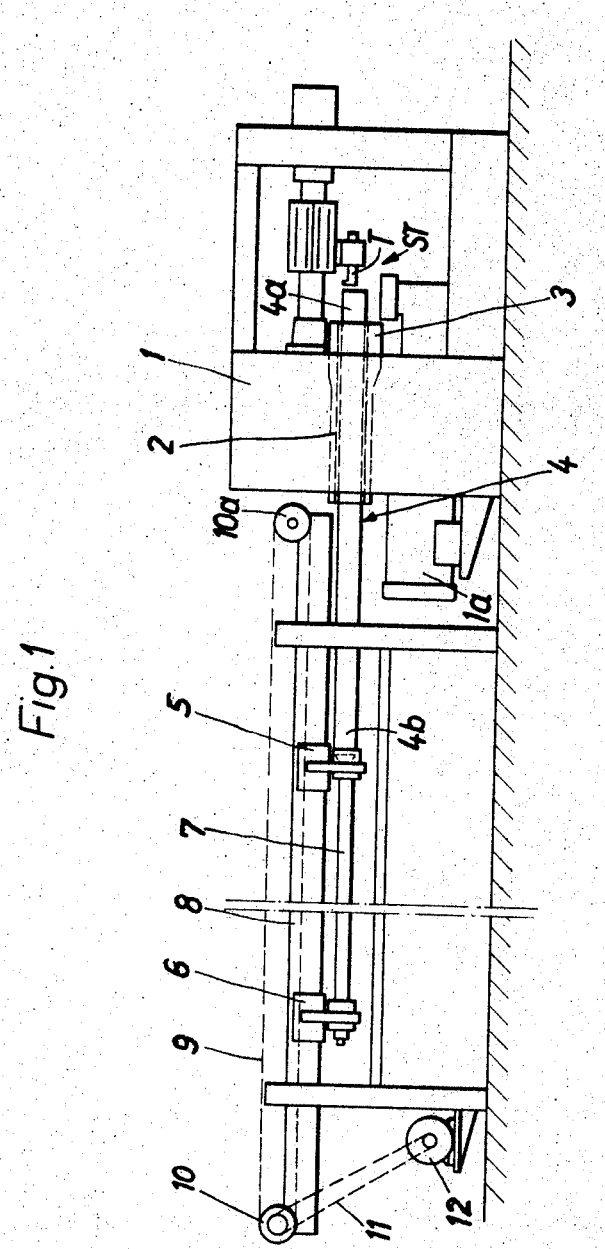

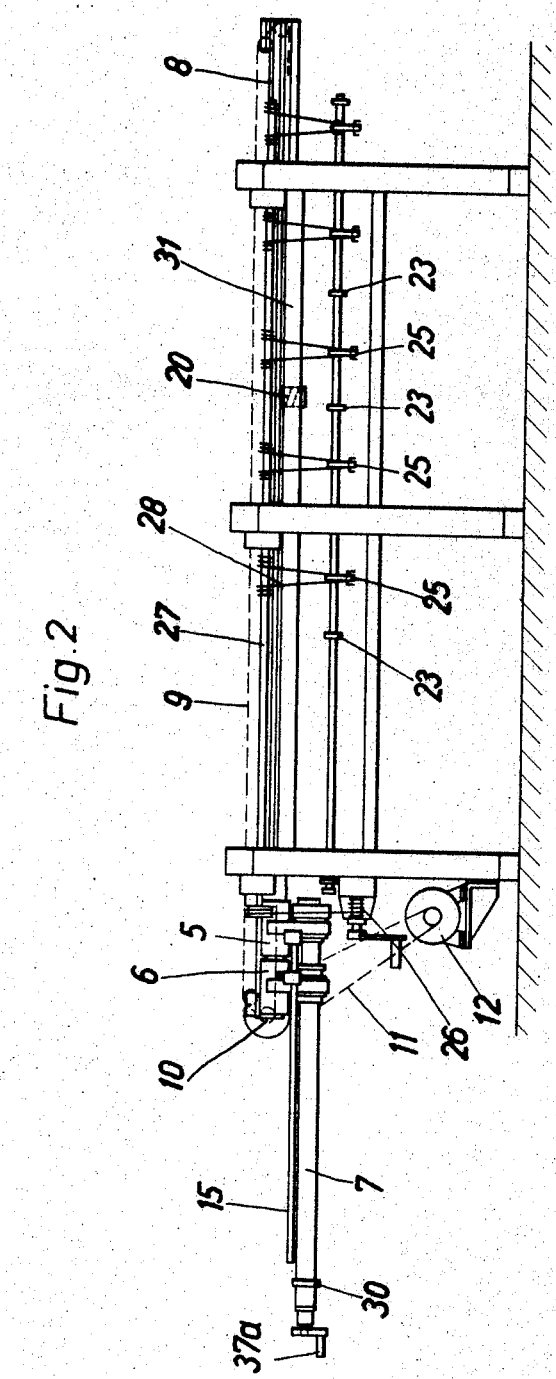

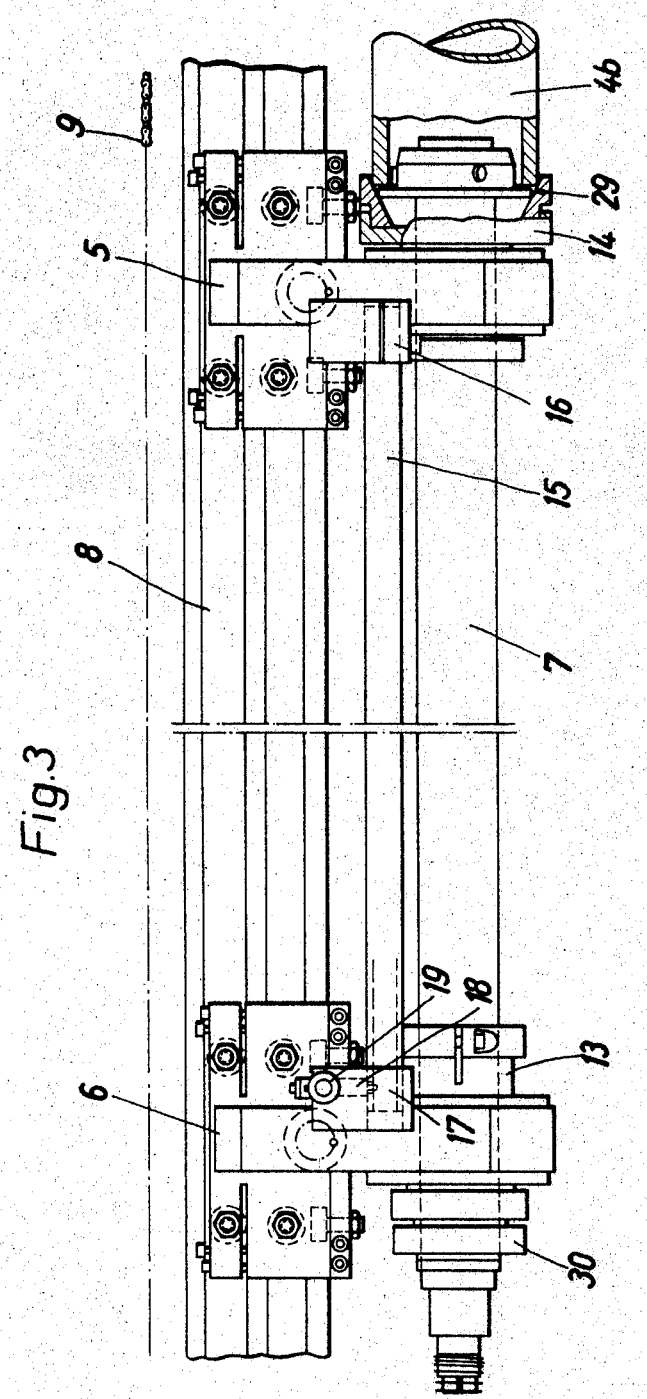

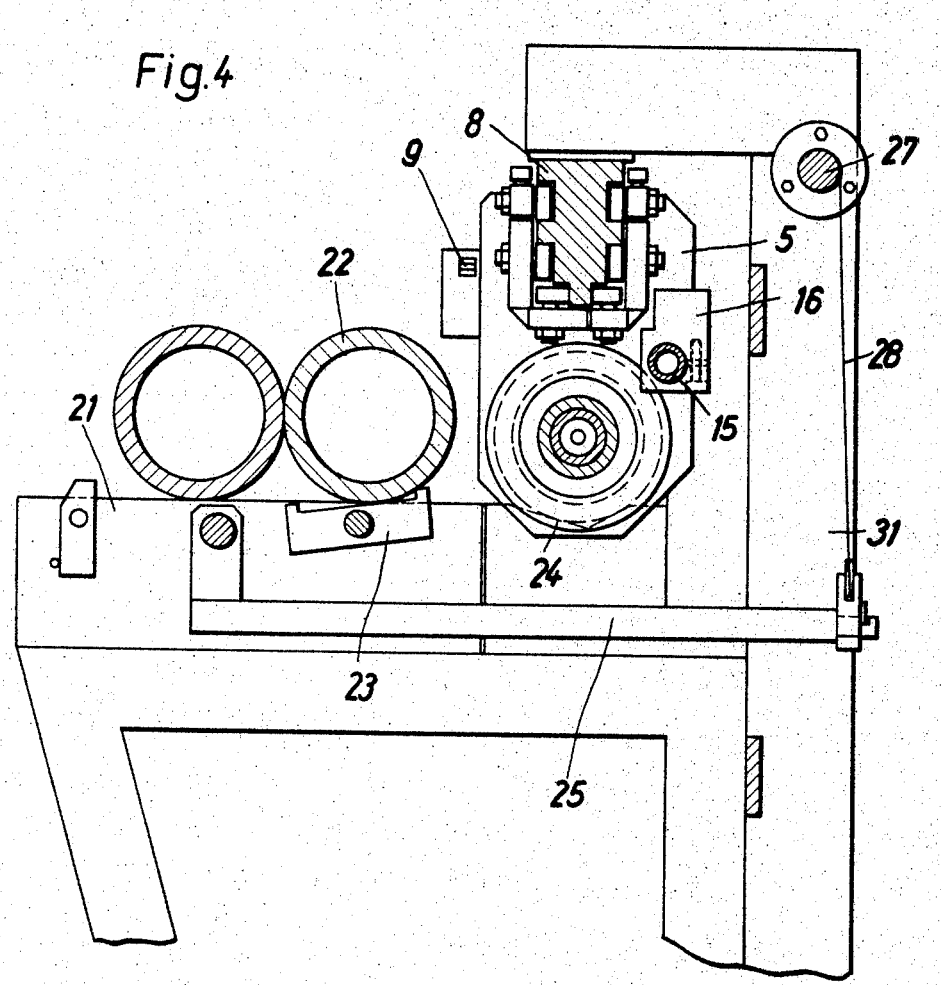

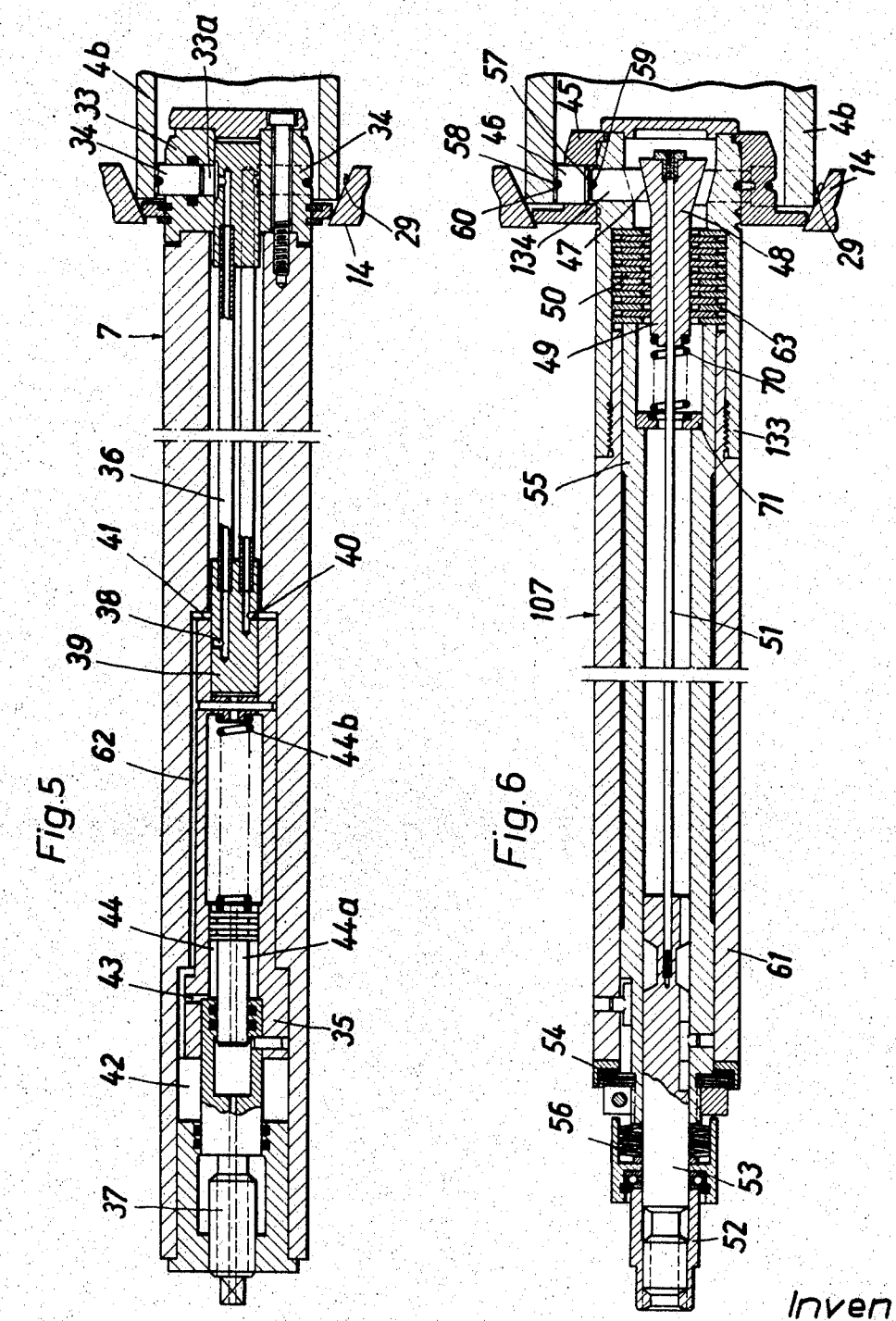

3,435,963
STOCK FEED MECHANISM
Hans Jacoby, Bielefeld, and Karl Spauschus, Weitramsdorf, near Coburg, Germany, assignors to Werkzeugmaschinenfabrik Gildemeister & Comp., AG, Bielefeld, Germany
Filed Nov. 22, 1966, Ser. No. 596,265
Claims priority, application Germany, Nov. 27, 1965, W 40,385
Int. Cl. B65h 5/08; B23b 13/02, 31/10
U.S. Cl. 214—1.5            22 Claims

ABSTRACT OF THE DISCLOSURE

A machine tool for machining large diameter tubular workpieces in which a leading end of the workpiece is centered from without in a hollow rotary spindle and in which the trailing end of the workpiece is internally clamped in alignment with the centered leading end by at least three clamping elements engaging the internal surface of the workpiece and arranged movable independently from each other substantially radially of the spindle axis on a leading portion of a reciprocable pusher means arranged coaxially with the spindle and rotatable about the spindle axis.

---

The present invention relates to machine tools in general, and more particularly to improvements in the construction and operation of mechanisms which can feed elongated tubular workpieces in automatic machine tools. Still more particularly, the invention relates to improvements in a mechanism for internally feeding tubular workpieces through the spindles of bar machines or the like.

It is already known to internally feed tubular workpieces through a hollow tubular work spindle so that the leading or feeding end of the workpiece projects beyond the spindle and can be treated by one or more tools while the spindle rotates. Such treatment normally involves removal of material preparatory to separation of an increment from the feeding end. The workpiece is then advanced by a step to place the next increment at the leading end into requisite position for engagement with material-removing and severing tools. As a rule, the workpiece is engaged by a chuck or tonks of the work spindle and is compelled to rotate therewith. The trailing or unused end of the workpiece is normally supported in a stationary tubular guide.

Such feeding is satisfactory in connection with lightweight tubular workpieces of small diameter. Once the diameter of the workpiece exceeds a certain size, the just outlined stock feed mechanism cannot guard against undue stock whip so that the revolving workpiece, which is very stiff and has a high moment of inertia, strikes against the rear end of the work spindle and/or against the stationary guide to reduce the life span of the machine tool and to cause frequent and serious disturbances in its operation, particularly as regards the quality of work. Other problems arise in connection with withdrawal of the unconsumed remainder of a large-diameter heavy workpiece and in connection with loading of such workpieces into the stock feed mechanism. Attempts to remove the unconsumed remainder of a heavy workpiece through the forward end of the work spindle, i.e., via the working station, have met with little success because the working station is often crammed with tools which must be dismantled or shifted sideways to provide room for withdrawal of the unconsumed remainder with attendant losses in time and output. Furthermore, the bore of a tubular workpiece is often eccentric, either in its entirety or in part and, therefore, centering of the unconsumed end from within merely contributes to undue whip when the workpiece is caused to rotate at high speed. Many accidents occur solely because the workpiece is improperly centered with reference to the spindle and because it is not held with a requisite force during high-speed rotation.

Presently known loading devices which supply fresh tubular workpieces to the stock feed mechanism of an automatic bar machine or the like are not sufficiently versatile, mainly because they must be adjusted or replaced if the machine tool is to treat different types of workpieces, particularly when a smaller-diameter workpiece is to be followed by a large-diameter workpiece, or vice versa. Moreover, the stock feed mechanism itself, too, must be adjusted or replaced to take a smaller-diameter or larger-diameter workpiece, and such adjustment or replacement invariably involves much work, expenses for spare parts, and substantial losses in output.

Accordingly, it is an important object of the present invention to provide a bar machine or an analogous machine tool with a novel and improved stock feed mechanism which can feed elongated tubular workpieces internally into and through a revolving hollow work spindle and which can feed workpieces of different diameters without necessitating any changes in setup and with the same degree of accuracy and safety.

Another object of the invention is to provide a stock feed mechanism of the just outlined characteristics which can be used with particular advantage in connection with feeding of relatively heavy, bulky and large-diameter tubular workpieces and which can be feed such workpieces through the interior of a rotary work spindle at the desired rate of speed and at desired intervals.

A further object of the invention is to provide a stock feed mechanism which can withdraw the unconsumed remainder of a tubular workpiece through the rear end of the work spindle so that the setup of tools at the working station in front of the work spindle need not be altered at all.

An additional object of the instant invention is to provide a novel method of centering and feeding large-diameter metallic or nonmetallic tubular workpieces in a stock feed mechanism of the above outlined character.

Still another object of the invention is to provide a method of supplying fresh workpieces to the stock feed mechanism of a bar machine or the like.

Another object of the invention is to provide a novel loading mechanism which can be used in a bar machine to supply fresh workpieces to the aforementioned stock feed mechanism and to construct and assemble the loading mechanism in such a way that it can handle large-diameter or small-diameter workpieces with equal facility and with the same degree of accuracy and safety.

A concomitant object of the invention is to provide a novel arrangement of centering and clamping units which can be utilized in the improved stock feed mechanism to confine rotating tubular stock to its axis of rotation.

A further object of the invention is to provide the stock feed mechanism with a novel pusher assembly which, in addition to bringing about intermittent axial movement of tubular workpieces through the work spindle, can also perform at least one additional important function, particularly that of centering one end of the workpiece and/or of insuring that the workpiece is safely held during rotation with the work spindle.

Another object of the invention is to provide a stock feed mechanism which occupies little room and which can handle relatively short or relatively long tubular workpieces without necessitating any changes in its design and/or operation.

An additional object of the invention is to provide a stock feed mechanism which can be combined with or installed in many presently known machine tools wherein tubular stock is fed internally and must rotate during engagement with material removing tools.

The novel features which are considered as characteristic of the invention are set forth in particular in the appended claims. The improved machine tool itself, however, both as to its contruction and its mode of operation, together with additional features and advantages thereof, will be best understood upon perusal of the following detailed description of certain specific embodiments with reference to the accompanying drawings, in which:

FIG. 1 is a schematic side elevational view of a machine tool which embodies one form of our invention and wherein the stock feed mechanism is shown in an intermediate position;

FIG. 2 is a side elevational view of the left-hand part of the machine tool, showing the stock feed mechanism in retracted or initial position ready for reception of a fresh tubular workpiece;

FIG. 3 is an enlarged side elevational view of a detail of the stock feed mechanism;

FIG. 4 is an enlarged transverse vertical section through the stock feed mechanism and further shows a portion of the loading unit;

FIG. 5 is an axial section through a push rod which forms part of the stock feed mechanism shown in FIGS. 1 to 3; and FIG. 6 is an axial section through a modified push rod.

Briefly stated, one feature of our present invention resides in the provision of a method of manipulating hollow tubular workpieces in a machine tool wherein the workpieces are rotated and internally fed lengthwise. The method comprises the steps of centering the leading or feeding and trailing or unused ends of an elongated tubular workpiece from without to confine the workpiece to its axis of rotation, i.e., that the axis of the peripheral surface of the workpiece coincides with a predetermined axis (namely, with the axis of a work spindle whose chuck holds and centers the feeding end from without), engaging or clamping the unused end of the thus centered workpiece from within, rotating the thus centered and clamped workpiece shifting the workpiece stepwise by transmitting pushing forces to the unused end, and removing successive increments from the feeding end during intervals between such shifting steps.

Another feature of the present invention resides in the provision of a method of feeding fresh workpieces of different diameters into a hollow work spindle which is rotatable about a predetermined, preferably horizontal axis. This method comprises supporting a fresh workpiece at a level below the predetermined axis, lifting the workpiece from such level into substantial axial alignment with the work spindle, centering the thus lifted workpiece with reference to the spindle so that the axis of the peripheral surface of the workpiece coincides with the axis of the spindle, and advancing the thus centered workpiece axially and stepwise through the spindle so that one end of the workpiece projects beyond the spindle and can be separated from the remainder of the workpiece during dwells between successive advances. The workpiece will be lifted to a greater or lesser extent, depending on its diameter.

Referring now to the drawings in detail, and first to FIG. 1, there is shown a machine tool having a main support or frame 1 for a rotary work spindle 2. The spindle 2 is hollow so that it can accommodate the feeding or leading end 4a of an internally fed tubular workpiece or stock 4. The front end of the spindle 2 carries a chuck 3 which can engage the feeding end 4a from without to that the workpiece 4 will rotate in response to rotation of the spindle. The drive for the spindle 2 includes an electric motor 1a and a suitable variable-speed transmission, not shown. The chuck 3 forms part of centering means for the workpiece 4 but its exact construction forms no part of the present invention. The working or treating station ST is adjacent to the right-hand end of the spindle 2 and accommodates one or more tools T which treat the feeding end 4a of the workpiece 4 and which also separate successive increments from the feeding end 4a so that the overall length of the workpiece decreases and the trailing or unused end 4b of the workpiece must be fed intermittently through the spindle 2 and in a direction toward the station ST. The arrangement is such that the tool or tools T mounted at the station ST first remove material from the feeding end 4a and ultimately separate a length of the feeding end. The workpiece 4 is then fed by a step until its feeding end abuts against a customary stock stop, not shown.

The unused end 4b of the workpiece 4 is supported by a novel stock feed mechanism including two slides or carriages 5, 6 and pusher means including a push rod 7 which is supported by the two carriages and whose leading portion is reciprocable into and from the interior of the spindle 2. The carriages 5 and 6 are suspended on a horizontal guide rail 8 and are slidable therealong in directions parallel to the axis of the spindle 2. The means for advancing the carriages 5, 6 comprises an endless chain 9 trained around the sprocket wheels 10, 10a which may be supported by the guide rail 8. The rear sprocket wheel 10 is driven by an endless chain 11 receiving motion from an electric motor 12, preferably a so-called rotary-field magnet which can continue to exert torque even when the chain 11 is at a standstill.

In operation, the rear or left-hand end of the push rod 7 is gripped by a longitudinally slotted gripping sleeve 13 (see FIG. 3) which is provided on the rear carriage 6. The sleeve 13 is rotatable with reference to the carriage 6. The right-hand end portion of the push rod 7 is axially movably received in a rotary conical sleeve 14 which is supported by the front carriage 5. The sleeve 14 constitutes a centering means for the unused end 4b of the workpiece 4 and its purpose is to cooperate with the chuck 3 to maintain the workpiece in exact axial alignment with the work spindle 2.

The carriages 5 and 6 can be coupled to each other by a distancing bar 15 whose front end is gripped by a gripping member 16 provided on the front carriage 5 (see FIG. 3). The rear end of the distancing bar 15 can be connected with the rear carriage 6 by a locking device 17 including a locking pin or bolt 18. This locking bolt can be moved to inoperative position to permit detachment of the distancing bar 15 from the rear carriage 6 when its roller follower 19 engages with a stationary opening or unlocking cam 20 (see FIG. 2). The follower 19 will engage with the cam 20 when, while sliding along the guide rail 8, the front carriage 5 reaches its foremost (rightmost) position. From then on, the front carriage 5 remains stationary but the rear carriage 6 can continue to advance in a direction to the right and to move closer to the carriage 5. The rear end of the push rod 7 is attached to the carriage 6 by the gripping sleeve 13 so that the push rod then advances the workpiece 4 lengthwise by increments of requisite length so that the feeding end 4a of the workpiece can be treated at the station ST. During such shifting of the workpiece 4 (subsequent to disengagement of the locking bolt 18) the push rod 7 slides with reference to the front carriage 5 until the workpiece is nearly consumed by being reduced to a remainder of minimum length, namely, of a length which is still sufficient to safely hold the stock. The machine tool is then arrested in a fully automatic way and the drive (motor 12) for the carriages 5, 6 and push rod 7 is reversed so that these parts return to their initial positions shown in FIG. 2. In such initial positions of the parts 5–7, the machine tool is ready to receive a fresh tubular workpiece 22 subsequent to removal of the remaining portion of previously treated workpiece 4.

A fresh workpiece 22 is shown in FIG. 4. This workpiece rests on a loading unit provided with separators 23 (see also FIG. 2) which can transfer workpieces individually and seriatim into aligned grooves or recesses 24 provided in levers 25. The levers 25 are pivotable on platform members or supports 21 and their free ends are suspended on cables or cords 28. By manipulating a winch 26 (see FIG. 2), the operator can wind the cables 28 onto an elongated reel or shaft 27 so that the fresh workpiece 22 resting in grooves 24 is lifted into substantial axial alignment with the hollow spindle 2 and push rod 7. FIG. 2 shows that, during such lifting of a fresh workpiece 22, the push rod 7 is held in its initial or fully retracted position so that the workpiece 22 enters the gap between the rear end of the spindle 2 and the front end of the push rod. In the next step, the push rod 7 is caused to move forwardly, whereby the centering sleeve 14 engages the trailing or unused end of the workpiece 22 and pushes it lengthwise through the spindle 2 and into the range of jaws in the chuck 3. The workpiece 22 comes to a halt when its feeding end abuts against the aforementioned stock stop at the station ST. If the unused end of the workpiece 22 is not in exact alignment with the push rod 7, the conical internal surface 29 of the centering sleeve 14 displaces the unused end portion of the workpiece until the centering step is completed, i.e., the axis of the workpiece 22 then coincides exactly with the common axis of the spindle 2 and push rod 7. Such centering will take place irrespective of the eccentricity of the bore in the workpiece 22 because the conical internal surface 29 engages the unused end of the workpiece from without. FIG. 3 shows clearly that the conical surface 29 flares outwardly toward the feeding end 4a of the workpiece 4, namely, toward the chuck 3 on the spindle 2. The taper of this conical surface 29 is such that the sleeve 14 can center tubular workpieces having different diameters. The sleeve 14 is removable so that it can be readily replaced by a differently dimensioned sleeve, particularly if the machine tool is to treat batches of tubular workpieces having widely different external diameters.

Once the unused end of the fresh workpiece 22 is properly centered by the sleeve 14, the unused end is clamped from within by a clamping device which is provided at the leading or right-hand end of the push rod 7. This clamping device will be described hereinafter. The rear carriage 6 is held in its initial position (FIG. 2) by a suitable detent device which is not shown in the drawings. The rear or left-hand end of the push rod 7 is provided with a ring-shaped motion transmitting member 30 which begins to shift the rear carriage 6 when the distance between the carriages 5 and 6 increases to a maximum value. The chain 9 is then coupled with the carriage 6, the locking bolt 18 is moved to its operative position to couple the distancing bar 15 to the carriage 6, and the push rod 7 is attached to the carriage 6 by the gripping sleeve 13. This completes loading of the fresh workpiece 22 and, from then on, the machine tool is operated automatically until the length of the workpiece 22 is reduced to a minimum length in a manner as described above in connection with the workpiece 4.

The numerals 31 shown in FIGS. 2 and 4 denote frame members which support the reel 28 and guide rail 8.

The unlocking cam 20 can be positioned in such a way that, when the carriages 5, 6 move back to their initial positions shown in FIG. 2, the locking bolt 18 automatically returned to operative position to couple the carriage 6 with the distancing bar 15. This can be achieved by providing a stop or detent (not shown) which can be installed on the guide rail 8 and engages the front carriage 5 in foremost (rightmost) position. When the drive (motor 12) for the carriages is reversed, the stop or detent temporarily holds the front carriage 5 in foremost position while the carriage 6 moves in a direction to the left until the locking bolt 18 reengages with the remainder of locking device 17 and couples the distancing bar 15 to the carriage 6. Further leftward movement of the carriage 6 then causes the carriage 5 to share such movement and to move back to its retracted position. Such operation will result in a simplification of the drive for the carriages 5 and 6 because the carriage 6 can remain permanently connected with the endless chain 9. Also, the push rod 7 can remain permanently attached to the rear carriage 6, i.e., the gripping sleeve 13 need not be operated at all. However, and if the machine tool is modified in the just outlined way, the length of the guide rail 8 must exceed the length shown in the drawings by a distance corresponding to that between the carriages 5 and 6, provided, of course, that the machine tool is to treat workpieces of the same length as those which can be treated in the structure shown in FIGS. 1 to 4. In other words, and if the distancing bar 15 is automatically recoupled with the carriage 6 when the two carriages move back toward their starting or retracted positions, the overall length of the machine tool will be greater but such modification will bring about other important advantages which were outlined above.

As shown in FIG. 2, the push rod 7 will extend to the left and beyond the guide rail 8 when the carriages 5 and 6 are moved to their initial positions. However, this is only for a short interval of time, namely, until the workpiece has been fed a few times so that the ring 30 of the push rod 7 reaches the rear carriage 6. Such temporary lengthening of the machine tool is normally acceptable, especially when the machine tool is mounted in the customary way so that the stock feed mechanism extends at an angle to the walkway in a machine shop. The walkway is then cleared as soon as the rear end of the push rod 7 reaches the rear end of the guide rail 8.

One embodiment of a clamping device which can engage the unused or trailing end 4b of the workpiece 4 from within is shown in FIG. 5. This clamping device comprises three equidistant radially outwardly movable clamping elements or jaws 34 each of which constitutes a hydraulic piston. The jaws 34 are reciprocable in a cylindrical leading portion or head 33 at the front end of the push rod 7 and the inner end of each jaw 34 extends into one of three cylinder chambers 33a provided in the head 33. In accordance with an advantageous feature of our invention, each of the jaws 34 is reciprocable independently of the other two jaws to insure that the clamping device of FIG. 5 can properly clamp from within unused ends 4b of tubular workpieces 4 whose bores are eccentric with reference to their peripheral surfaces. Thus, and looking at FIG. 5, it is immaterial whether or not the wall thickness of the unused end 4b of the workpiece 4 is constant because each of the three jaws 34 can engage the internal surface of the workpiece independently of the other two jaws. Since the conical internal surface 29 of the sleeve 14 centers the unused end 4b from without, and since the jaws 34 grip the unused end 4b from within, the workpiece 4 is securely held and is compelled to rotate with the spindle 2.

The clamping device of FIG. 5 further comprises arresting means for arresting the jaws 34 in their operative or extended positions to make sure that the unused end 4b of the workpiece 4 cannot be released by accident. The arresting means is operated hydraulically and, therefore, each of the jaws 34 constitutes a hydraulic piston which extends into its chamber 33a. These chambers can receive hydraulic fluid in response to displacement of a master piston 35 and through conduits 36 accommodated in an axial bore of the push rod 7. The rear ends of the conduits 36 are fixed to a distributor 39 which is fixedly received in the cylindrical body of the push rod 7. The master piston 35 is shiftable by an externally threaded shaft 37 having a rear end portion of other than circular outline extending from the rear end of the push rod 7 so that it can be engaged by a crank handle 37a shown in FIG. 2. When the crank handle 37a causes the master piston 35 to perform a working stroke (in a direction to the right, as viewed in FIG. 5), the master piston reaches a position in which it seals two inlets 38 of the distributor 39 for two conduits 36. This entraps the fluid in the respective chambers 33a so that the associated jaws 34 are held against retraction and exert a strong clamping force against the internal surface of the workpiece 4. The inlet 40 of the distributor 39 for the third conduit 36 remains unsealed so that the chamber 33a of the third jaw 34 continues to communicate with the main supply of hydraulic fluid through an annular clearance 41 and an axially parallel peripheral groove 62 of the master piston 35. The main supply is accommodated in a pressure chamber 42 of the push rod 7 and is maintained under substantial pressure communicated through a connecting bore 43 which connects the pressure chamber 42 with a storage space 44. The manner in which the fluid filling the storage space 44 is pressurized by a plunger 44a and spring 44b is self-evident. Pressurization of fluid in the pressure chamber 42 insures that the third jaw 34 invariably bears against the internal surface of the workpiece 4, even if the internal surface is not concentric with the peripheral surface of the workpiece. This third jaw 34 is not shown in FIG. 5.

If the internal diameter of the workpiece 4 is very large, the jaws 34 will be replaced by longer jaws or the push rod 7 is provided with an attachment including a ring-shaped carrier 45 (see FIG. 6) for reciprocable auxiliary jaws 46 each of which can be shifted by one of the jaws 34.

In many presently known automatic bar machines and similar machine tools which utilize tubular stock of considerable length and large diameter, the unused end of the workpiece must be provided with a concentric counterbore to insure satisfactory centering from within. Such counterboring must be carried out in special machines which contributes to the ultimate cost of articles obtained from tubular workpieces. Also, the production is much slower and heavy-duty transfer equipment is needed to move workpieces from the counterboring station to the stock feed mechanism. All this is avoided by resorting to a stock feed mechanism of the type shown in FIGS. 1 to 5 because the jaws 34 or 46 can properly clamp the workpiece from within regardless of the eccentricity of the bore at the unused end 4b of the workpiece, and the centering sleeve 14 can properly center the unused end 4b from without so that the workpiece is invariably confined to its axis of rotation and cannot whip or carry out any other undesirable movements. Thus, by the simple expedient of using a clamping device whose elements are movable independently of each other and by simultaneously centering the unused end of the workpiece from without, counterboring of such workpieces may be dispensed with because eventual eccentricity of the trailing portion of or the entire length of the bore in a workpiece cannot interfere with accurate centering for rotation about the axis of the work spindle.

Another important advantage of the machine tool shown in FIGS. 1 to 5 is that the unused end 4b of the workpiece 4 is safely held against undue whip even if the drive which advances the workpiece through the work spindle 2 fails to operate properly or breaks down. Thus, the jaws 34 or 46 can clamp the unused end 4b irrespective of movements of the chain 9 and regardless of whether the chain moves the workpiece 4 forwardly or causes the push rod 7 to withdraw the unconsumed remainder of a workpiece rearwardly through and beyond the work spindle 2 so that such remainder need not be removed through the working station ST. Satisfactory clamping and centering of both ends of a workpiece will reduce the likelihood of accidents and contributes to greater accuracy of the machining operation. Also, the wear upon the machine tool is reduced so that such tool can have a much longer useful life and requires less frequent repairs or overhauling.

An advantage of the loading unit shown in FIGS. 2 and 4 is seen to reside in that this unit can supply to the stock feed mechanism workpieces of different diameters without necessitating any adjustments in the construction and/or operation of the stock feed mechanism. Thus, if the diameter of the workpiece 22 shown in FIG. 4 is larger than that of the workpiece 4 which is already centered in the stock feed mechanism, the unconsumed remainder of the workpiece 4 will be removed rearwardly in a first step and the larger-diameter workpiece 22 is then rolled into the grooves 24. In the next step, the winch 26 is operated to lift the workpiece 22 through a lesser distance than was necessary in connection with the preceding workpiece 4 because, while it rests at the level determined by the support 21, the axis of the workpiece 22 (which is assumed to have a diameter exceeding that of the workpiece 4) is higher up than the diameter of a smaller-diameter workpiece also resting on the support 21. In other words, all that is necessary in order to lift workpieces of different diameters from the grooves 24 in the levers 25 into substantial registry with the push rod 7 and work spindle 2 is to operate the winch 26 through a lesser or greater number of revolutions. The reel or shaft 27 is preferably common to all of the cables 28 even though it is possible to utilize two or more separate reels.

Referring finally to FIG. 6, there is shown a mechanical clamping device which can be provided at the front end of a push rod 107 to engage the unused end 4b of a workpiece 4 from within. The inner ends of the clamping elements or jaws 134 are inclined and abut against the conical surface 47 of a reciprocable spreading member or spreader 48 having a cylindrical stem 49 which is reciprocable in a passage defined by two sets of alternating annular laminae 50, 63. The laminae 50 have smaller-diameter bores and are spaced from the internal surface of the leading portion or head 133. The laminations 63 have larger-diameter bores and are adjacent to the internal surface of the head 133. An elongated pull rod 51 connects the stem 49 with a shaft 53 which is reciprocable by an internally threaded motion transmitting nut 52 engageable by a suitable tool, not shown. By rotating the nut 52 in one direction, the operator can draw the spreader 48 in a direction to the left, as viewed in FIG. 6, so that the jaws 134 move radially outwardly. This causes the aforementioned auxiliary jaws 46 to engage the unused end 4b of the workpiece 4 from within. Depending on the eccentricity of the internal surface of the workpiece 4, the spreader 48 will move radially, i.e., out of axial alignment with the push rod 107, and such radial movement is permitted by the provision of laminae 50 and 63. The laminae 50 are shiftable radially with reference to the laminae 63. As the operator continues to rotate the nut 52, the spreader 48 will be locked in its position by an elongated compressing cylinder 55 which can press the laminae 50 against the laminae 63.

The jaws 134 and 46 are held against turning by split rings 57, 58 which respectively extend into grooves 59, 60. The grooves 59 are provided in the outer end faces of the jaws 134 and the grooves 60 are provided in the outer end faces of the auxiliary jaws 46. The pull rod 51 is slidable in the spreader 48 and the latter's stem 49 is biased by a spring 70. One end of the spring 70 bears against a detent 71 which engages an internal shoulder of the cylinder 55. The spring 70 will cause the spreader 48 to move to the right as soon as the nut 52 is rotated in a sense to reduce the bias of two sets of dished springs 54 and 56. The cylinder 55 is telescoped into an elongated barrel 61 of the push rod 107.

The function of dished springs 54 is to hold back the compressing cylinder 55 when the operator begins to rotate the nut 52 in a sense to draw the pull rod 51 and spreader 48 in a direction to the left, as viewed in FIG. 6. This insures that the laminae 50 are free to move radially with reference to laminae 63 if the bore of the unused end 4b is eccentric with reference to the external surface which is centered by the conical surface 29 of the sleeve 14. Also, the fact that the compressing cylinder 55 is initially held back insures that the conical surface 47 of the spreader 48 can actually press the auxiliary jaws 46 against the internal surface of the unused end 4b. Were the cylinder 55 allowed to apply pressure against the leftmost lamina 63 in immediate response to rotation of the nut 52, the laminae 50 would prevent any radial movement of the spreader 48 which would result in inferior internal clamping of the workpiece. The force with which the springs 54 oppose rightward movement of the compressing cylinder 55 is adjustable by a clamping nut which is shown in FIG. 6 immediately adjacent to the leftmost spring 54. The springs 54 do not limit the rightward movement of the compressing cylinder 55. Such rightward movement is terminated when the cylinder 55 and spreader 48 eliminate clearances between the laminae 50, 63 so that such laminae form a solid block.

The pressure exerted by cylinder 55 against the leftmost lamina 63 approximates the reaction force opposing the pull upon the spreader 48. The spring 54 transmits a fraction of such reaction force to the barrel 61. Another fraction of the pull upon the spreader 48 is taken up by the spring 70.

The purpose of dished springs 56 is to indirectly limit the clamping force upon the laminae 50, 63 by determining the extent of rotation of the nut 52 in order to move a sleeve (shown in FIG. 6) which surrounds such springs 56 into abutment with the aforementioned clamping nut for the springs 54. Once the sleeve engages with the clamping nut, the nut 52 offers a suddenly increasing resistance to further rotation and the operator knows that the laminae 50, 63 are securely clamped by cylinder 55 and spreader 48. The springs 5b then store sufficient energy to compensate for minor lengthening of the parts which constitute the push rod 107 and to prevent a weakening of the clamping action in response to vibration.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. A machine tool, particularly a machine for treating large-diameter tubular workpieces, comprising a hollow rotary work spindle arranged to accommodate the feeding end of a hollow tubular workpiece and having centering means to center the feeding end from without; reciprocable pusher means coaxial with said spindle, said pusher means being rotatable about the axis of said spindle and having a leading portion receivable in the unused end of the workpiece whose feeding end is centered in said spindle; second centering means coaxial with said pusher means and engageable with the external surface of said unused end to confine the workpiece to its axis of rotation; and clamping means including at least three outwardly extending clamping elements provided on said leading portion circumferentially displaced from each other and engageable with the internal surface of said unused end, each of said clamping elements being movable substantially radially of the spindle axis and independently from the other clamping element so as to clamp said unused end of the workpiece in alignment with said feeding end which is centered by said centering means of said spindle.

2. A machine tool as defined in claim 1, wherein the leading portion of said pusher means is reciprocable into and from the interior of said spindle.

3. A machine tool as defined in claim 1, wherein said second centering means comprises a sleeve provided with a conical internal surface having an axis which coincides with the axis of said spindle and flaring outwardly toward said first mentioned centering means, said conical surface being engageable with the unused end of the workpiece from without.

4. A machine tool as defined in claim 1, further comprising means for arresting said clamping elements in positions of engagement with the internal surface of said unused end.

5. A machine tool as defined in claim 1, wherein each of said clamping elements is constituted by a hydraulic piston and said leading portion is provided with cylinder chambers for said clamping elements, said clamping means further comprising fluid-containing pressure chamber means provided in said pusher means, conduit means connecting said pressure chamber means with said cylinder chambers, and master piston means for forcing fluid from said pressure chamber means into said cylinder chambers.

6. A machine tool as defined in claim 5, wherein said master piston means is movable to a position in which at least some of said conduit means are sealed from said pressure chamber means to thereby arrest the respective clamping elements in positions of engagement with the internal surface of said unused end.

7. A machine tool as defined in claim 5, wherein said clamping means further comprises distributor means having inlet means communicating with said pressure chamber means and said conduit means, said master piston means being movable to a position in which at least some of said inlet means are sealed from said pressure chamber means to thereby arrest the respective clamping elements in positions of engagement with the internal surface of said unused end.

8. A machine tool as defined in claim 5, wherein at least one of said conduit means remains in permanent communication with said pressure chamber means to maintain the respective clamping element under fluid pressure corresponding to the pressure in said pressure chamber means.

9. A machine tool as defined in claim 8, further comprising means for subjecting the fluid in said pressure chamber means to pressure which rises in response to movement of said master piston means in a direction to force fluid into said cylinder chambers.

10. A machine tool as defined in claim 1, wherein said clamping elements are reciprocably guided in said leading portion and said clamping means further comprises spreader means reciprocable in said leading portion axially of said pusher means and having an inclined surface engaging with and arranged to move said clamping elements radially outwardly in response to axial movement of said spreader means in one direction, and motion transmitting means for moving said spreader means axially.

11. A machine tool as defined in claim 10, wherein said pusher means is hollow and said spreader means is also movable radially of said pusher means, said clamping means further comprising a first set of annular laminae received in said pusher means and surrounding with clearance a portion of said spreader means, a second set of annular laminae alternating with the laminae of said first set, said second set of laminae being received with clearance in said pusher means and surrounding said portion of said spreader means, and compressing means for urging the laminae of said sets against each other to arrest said spreader means against radial movement in response to axial movement of said spreader means in said one direction.

12. A machine tool as defined in claim 11, wherein said compressing means comprises a cylinder reciprocably received in said pusher means and movable axially by said motion transmitting means toward said sets of laminae.

13. A machine tool as defined in claim 12, further comprising resilient means for urging said compressing means against said laminae with a delay following axial movement of said spreader means in said one direction.

14. A machine tool as defined in claim 1, further comprising reciprocating means for said pusher means including guide means extending in parallelism with said spindle, a pair of carriages reciprocably supported by said guide means, one of said carriages being disposed between the other carriage and said spindle, distancing means connectable with said carriages to maintain them at a preselected distance from each other, means for moving said pusher means in response to movement of said one carriage, and drive means for moving said one carriage through the intermediary of said other carriage and said distancing means.

15. A machine tool as defined in claim 14, wherein said drive means comprises an endless chain adapted to be coupled with said other carriage.

16. A machine tool as defined in claim 14, further comprising releasable locking means coupling said distancing means to said other carriage and unlocking means adjacent to the path of movement of said distancing means for releasing said locking means in response to movement of said carriages through a predetermined distance toward said spindle.

17. A machine tool as defined in claim 16, wherein said locking means comprises a locking bolt movable between open and locking positions, said unlocking means comprising fixed cam means adjacent to the path of movement of said bolt to move the latter to open position.

18. A machine tool as defined in claim 1, wherein the leading portion of said pusher means is reciprocable from a foremost position in the interior of said spindle to a retracted position spaced from said spindle by a distance which at least equals the length of a fresh workpiece, and further comprising loading means for suplying fresh workpieces between said spindle and said pusher means in retracted position of said leading portion.

19. A machine tool as defined in claim 18, wherein said loading means comprises support means for supporting a fresh workpiece at a level below said spindle, and lifting means for raising successive fresh workpieces from said support means into substantial axial alignment with said pusher means and said spindle.

20. A machine tool as defined in claim 19, wherein said lifting means comprises lever means pivoted to said support means and having groove means for accommodating a fresh workpiece in parallel with the axis of said spindle, and winch means for pivoting said lever means in a direction to raise the workpiece in said groove means into substantial axial alignment with said spindle and said pusher means.

21. A machine tool as defined in claim 20, wherein said winch means comprises a single reel rotatably mounted in a fixed frame, cables connecting said lever means with said reel, and manually operated means for rotating said reel to collect said cables and to thereby raise a fresh workpiece which is accommodated in the groove means of said lever means.

22. A machine tool as defined in claim 19, wherein said lifting means is arranged to raise fresh workpieces to different levels above said support means, depending on the diameters of such fresh workpieces, to place the workpieces into substantial axial alignment with said spindle and said pusher means.

References Cited
UNITED STATES PATENTS

| | | | |
|---|---|---|---|
| 1,867,266 | 7/1932 | Johnson et al. | 279—2 |
| 2,601,494 | 6/1952 | Baule | 214—1.2 |
| 2,623,267 | 12/1952 | Retz | 214—1.5 X |
| 2,626,452 | 1/1953 | Gridley | 214—1.4 |
| 3,353,688 | 11/1967 | Kuckelsberg | 214—1.3 |

GERALD M. FORLENZA, *Primary Examiner.*

FRANK E. WERNER, *Assistant Examiner.*

U.S. Cl. X.R.

82—2.7; 279—2, 4; 294—96